United States Patent
Shen et al.

(10) Patent No.: US 10,097,320 B2
(45) Date of Patent: Oct. 9, 2018

(54) USER TERMINAL, RADIO BASE STATION AND RADIO COMMUNICATION METHOD

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/028,068

(22) PCT Filed: Oct. 8, 2014

(86) PCT No.: PCT/JP2014/076923
§ 371 (c)(1),
(2) Date: Apr. 8, 2016

(87) PCT Pub. No.: WO2015/053305
PCT Pub. Date: Apr. 16, 2015

(65) Prior Publication Data
US 2016/0241364 A1 Aug. 18, 2016

(30) Foreign Application Priority Data
Oct. 9, 2013 (JP) ................................ 2013-212300

(51) Int. Cl.
*H04W 72/04* (2009.01)
*H04L 5/00* (2006.01)
(Continued)

(52) U.S. Cl.
CPC ......... *H04L 5/0007* (2013.01); *H04B 1/0067* (2013.01); *H04L 5/005* (2013.01);
(Continued)

(58) Field of Classification Search
CPC ... H04L 5/0007; H04L 27/2636; H04L 5/005; H04W 56/0035; H04W 72/1215; H04W 72/048; H04B 7/0617
See application file for complete search history.

(56) References Cited

U.S. PATENT DOCUMENTS

| 5,663,954 A * | 9/1997 | Hakkanen | H04B 7/2656 370/278 |
| 8,249,208 B2 | 8/2012 | Dubouloz et al. | |

(Continued)

FOREIGN PATENT DOCUMENTS

| EP | 0709977 | * | 5/1996 | ............... H04J 3/06 |
| EP | 0709977 A2 | | 5/1996 | |

(Continued)

OTHER PUBLICATIONS

International Search Report issued in corresponding application No. PCT/JP2014/076923 dated Dec. 16, 2014 (4 pages).
(Continued)

*Primary Examiner* — Lakeram Jangbahadur
(74) *Attorney, Agent, or Firm* — Osha Liang LLP

(57) ABSTRACT

To suppress complication of transmission/reception processing even in the case where a user terminal supports a plurality of bandwidths, or the case where the terminal concurrently connects to a plurality of radio communication systems with different usage frequencies, a user terminal, which communicates with a radio base station for forming a wide-area cell and anther radio base station for forming a narrow-area cell in a radio communication system where the narrow-area cell is provided inside the wide-area cell, is provided with a reference signal generating section that generates a sampling frequency of a baseband signal of the wide-area cell as a reference signal, a frequency adjusting section that converts a frequency of the reference signal by n/m times, and a baseband processing section that uses a
(Continued)

frequency subjected to frequency conversion as a sampling frequency of a baseband signal of the narrow-area cell.

5 Claims, 11 Drawing Sheets

(51) Int. Cl.
*H04L 27/26* (2006.01)
*H04W 56/00* (2009.01)
*H04W 72/12* (2009.01)
*H04B 1/00* (2006.01)
*H04B 7/06* (2006.01)
*H04W 88/06* (2009.01)

(52) U.S. Cl.
CPC ..... *H04L 27/2636* (2013.01); *H04W 56/0035* (2013.01); *H04W 72/048* (2013.01); *H04W 72/1215* (2013.01); *H04B 7/0617* (2013.01); *H04W 88/06* (2013.01)

(56) References Cited

U.S. PATENT DOCUMENTS

| | | |
|---|---|---|
| 2008/0043866 A1 | 2/2008 | Mujtaba |
| 2009/0185476 A1 | 7/2009 | Tsai et al. |
| 2009/0300689 A1 | 12/2009 | Conte et al. |
| 2012/0195391 A1 | 8/2012 | Zhang et al. |
| 2014/0307689 A1 | 10/2014 | Kishiyama |

FOREIGN PATENT DOCUMENTS

| | | | |
|---|---|---|---|
| EP | 2131614 A1 | 12/2009 | |
| JP | H09130291 A | 5/1997 | |
| JP | 2009253757 | * 10/2009 | ............... H04B 7/15 |
| JP | 2009253757 A | 10/2009 | |
| JP | 2011510569 A | 3/2011 | |
| JP | 2013106144 A | 5/2013 | |
| WO | 2005112566 A2 | 12/2005 | |
| WO | 2005112566 A3 | 3/2006 | |

OTHER PUBLICATIONS

Written Opinion of the International Searching Authority issued in corresponding application No. PCT/JP2014/076923 dated Dec. 16, 2014 (4 pages).
Ishii et al., "A Novel Architecture for LTE-B C-plane/U-plane Split and Phantom Cell Concept"; Globecom Workshop: International Workshop on Emerging Technologies for LTE-Advanced and Beyond-4G; pp. 624-630; 2012 (7 pages).
3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).
Extended European Search Report issued in corresponding European Application No. 14852711.2, dated Oct. 17, 2017 (7 pages).
Office Action issued in the counterpart Japanese Patent Application No. 2013-212300, dated Jun. 27, 2017 (12 pages).
Office Action issued in corresponding European Application No. 14852711.2, dated Mar. 12, 2018 (6 pages).

* cited by examiner

| n/m | $f_s$ (MHz) | $\Delta f$ (kHz) | FDD SUBFRAME LENGTH $t_{SF\_FDD}(\mu s)$ | NUMBER OF FDD SUBFRAMES | TDD SUBFRAME LENGTH $t_{SF\_TDD}(\mu s)$ | NUMBER OF TDD SUBFRAMES |
|---|---|---|---|---|---|---|
| 4 | 122.88 | 60 | 250 | 4 | 500 | 2 |
| 8 | 245.76 | 120 | 125 | 8 | 250 | 4 |
| 16 | 491.52 | 240 | 62.5 | 16 | 125 | 8 |
| 20 | 614.4 | 300 | 50 | 20 | 100 | 10 |
| 32 | 983.04 | 480 | 31.25 | 32 | 62.5 | 16 |

| n/m | fs (MHz) | Δf (kHz) | FFT SIGNAL LENGTH $t_{FFT}$ (μs) | TDD SUBFRAME LENGTH $t_{SF\_TDD}$ (μs) |
|---|---|---|---|---|
| 4 | 122.88 | 60 | 16.67 | 500 |
| 8 | 245.76 | 120 | 8.33 | 250 |
| 16 | 491.52 | 240 | 4.17 | 125 |
| 20 | 614.4 | 300 | 3.33 | 100 |

| | CP LENGTH | 0.5 μs |
|---|---|---|
| | NUMBER OF SYMBOLS FOR DATA (DL+UL) | 22 |
| | NUMBER OF SYMBOLS FOR DL CONTROL | 2 |
| | NUMBER OF SYMBOLS FOR UL CONTROL | 2 |
| | GUARD TIME | 1.8 μs |

(FFT SIGNAL LENGTH + CP LENGTH)
×(THE NUMBER OF DATA CH SYMBOLS + THE NUMBER OF CONTROL CH SYMBOLS)
+GUARD TIME×2
=SUBFRAME LENGTH (4.17+0.5) × (22+2+2)+1.8 × 2 =125

FIG.9

USER TERMINAL, RADIO BASE STATION AND RADIO COMMUNICATION METHOD

TECHNICAL FIELD

The present invention relates to a user terminal, radio base station and radio communication method in the next-generation mobile communication system.

BACKGROUND ART

In LTE (Long Term Evolution) with the aims of high-speed data rates, low delay and the like and a successor system (for example, also referred to as LTE-Advanced, FRA (Future Radio Access), 4G and the like) to LTE, radio communication systems (for example, also referred to as Het Net (Heterogeneous Network)) have been studied in which a small cell (including a picocell, femtocell and the like) having relatively small coverage with a radius of about several meters to several tens of meters is arranged, while overlapping a macrocell having relatively large coverage with a radius of about several hundreds of meters to several kilometers (for example, Non-patent Document 1).

In such a radio communication system are studied a scenario (for example, also referred to as co-channel) using the same frequency band in both the macrocell and the small call, and another scenario (for example, also referred to as separate frequency) using different frequency bands in the macrocell and the small cell. More specifically, in the latter scenario, it is studied that a relatively low frequency band (for example, 2 GHz) (hereinafter, referred to as low-frequency band) is used in the macrocell, and that a relatively high frequency band (for example, 3.5 GHz and 10 GHz) (hereinafter, referred to as high-frequency band) is used in the small cell.

CITATION LIST

Non-Patent Literature

[Non-patent Document 1]3GPP TR 36.814 "E-UTRA Further advancements for E-UTRA physical layer aspects"

SUMMARY OF INVENTION

Technical Problem

In the future radio communication network, such a configuration is expected that a user terminal connects to a plurality of radio communication systems with different usage frequencies. However, in the existing system (LTE/LTE-A), since there is no compatibility with earlier systems in transmission schemes and circuit configurations, it is not possible to connect concurrently, and there is a need to select one of the systems to connect.

In a radio communication system using a newly introduced high-frequency band in the future, it is studied to support a plurality of bandwidths corresponding to a communication environment and the like. Further, it is expected that the cell using the high-frequency band is arranged while overlapping an area of the existing system (LTE/LTE-A). In such an environment in which the macrocell using the low-frequency band and the small cell using the high-frequency band coexist, the case is considered that a user terminal concurrently connects to a plurality of radio communication systems with different frequencies.

However, in the case where a user terminal supports a plurality of bandwidths, the terminal needs to be provided with circuits corresponding to respective bandwidths. Further, in the case where a user terminal concurrently connects to a plurality of radio communication systems with different frequencies, the terminal needs to be provided with circuits corresponding to different radio schemes (for example, radio frame configuration). As a result, the circuit scale of the user terminal is increased, and there is the risk that transmission/reception processing is complicated.

The present invention was made in view of such a respect, and it is an object of the invention to provide a user terminal, radio base station and radio communication method for enabling complication of transmission/reception processing to be suppressed, even in the case where the user terminal supports a plurality of bandwidths, or the case where the terminal concurrently connects to a plurality of radio communication systems with different usage frequencies.

Solution to Problem

A user terminal of the present invention is a user terminal that communicates with a radio base station for forming a wide-area cell and anther radio base station for forming a narrow-area cell in a radio communication system where the narrow-area cell is provided inside the wide-area cell, and is characterized by having a reference signal generating section that generates a sampling frequency of a baseband signal of the wide-area cell as a reference signal, a frequency adjusting section that converts a frequency of the reference signal by n/m times and a baseband processing section that uses a frequency subjected to frequency conversion as a sampling frequency of a baseband signal of the narrow-area cell.

Advantageous Effects of Invention

According to the present invention, even in the case where the user terminal supports a plurality of bandwidths, or the case where the terminal concurrently connects to a plurality of radio communication systems with different usage frequencies, it is possible to suppress complication of transmission/reception processing.

BRIEF DESCRIPTION OF DRAWINGS

FIG. 9 is an explanatory diagram showing one example of a method for designing a frame configuration of the MM cell according to this Embodiment;

DESCRIPTION OF EMBODIMENTS

Figure 1:
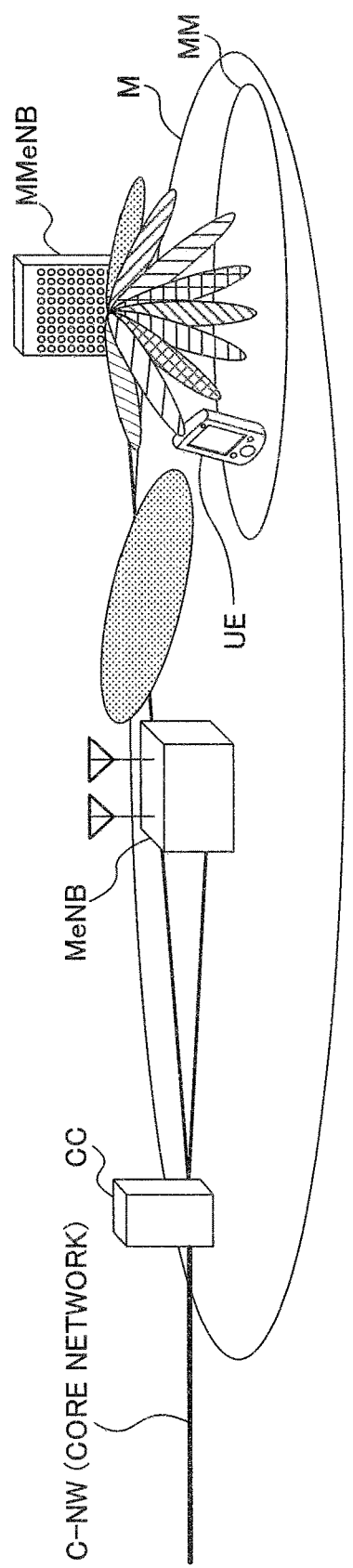
FIG. 1 is a diagram showing one example of a network configuration to which is applied a radio base station according to this Embodiment.

FIG. 1 is one example of a conceptual diagram of a network configuration to which is applied a radio base station (MMeNB) according to this Embodiment. Referring to FIG. 1, described is a configuration that a user terminal concurrently connects to a plurality of radio communication systems in radio communication systems in which a narrow-area cell is provided inside a wide-area cell. In this Embodiment, the wide-area cell (macrocell M) is formed with a macro base station (MeNB), and the narrow-area cell (Massive-MIMO cell MM) is formed with the MM base station (MMeNB). FIG. 1 illustrates the network configuration where the Massive-MIMO cell MM is overlaid and formed on the cell area of the macrocell M. In addition, network configurations to which the MM base station according to this Embodiment is applied are not limited to the configuration as shown in FIG. 1.

The MMeNB performs signal transmission on a user terminal UE positioned inside the Massive-MIMO cell MM in a high-frequency band by a MIMO transmission scheme (Massive MIMO (Multi Input Multi Output), hereinafter expressed as "Massive-MIMO transmission scheme") using a large number of antenna elements. More specifically, by controlling amplitude and phase of each transmission signal using a plurality of antenna elements, the MM base station is capable of forming (beam forming) a transmission beam having directivity for each user terminal to perform signal transmission. Use of the Massive-MIMO transmission scheme is studied in mobile communication systems subsequent to LTE-A.

In the Massive-MIMO transmission scheme, a data rate (frequency usage efficiency) is increased by transmitting data using a large number (for example, 100 or more) of antenna elements. Since data is transmitted using a large number of antenna elements, it is possible to improve transmission efficiency associated with multiplexing as compared with the case of using a small number of antenna elements, and it is possible to perform radio communication at higher speed than conventional communication. Further, sophisticated beam forming is made possible by combinations of a large number of antenna elements.

Herein, the beam forming (BF) is a technique for controlling amplitude and phases of respective transmission/reception signals in a plurality of antenna elements, thereby providing a transmission/reception beam with directivity, and also enabling a shape of the beam to be changed. In this beam forming, generally, as the number of antenna elements increases, it is possible to perform more sophisticated control. In other words, corresponding to the number of antenna elements, it is possible to control the number of beams, the shape of each beam (width of the beam in a horizontal plane, width of the beam in a vertical plane, etc.) and the direction and gain of the beam in detail. For example, by narrowing the width of the beam (i.e. forming a narrow beam), it is possible to obtain high gain (power density). Accordingly, by applying the beam forming, it is possible to change the coverage area of the Massive-MIMO cell MM.

The user terminal (UE) is configured to be able to communicate with the macro base station for forming the macrocell M when the terminal is positioned inside the macrocell M, and when the terminal is positioned inside the Massive-MIMO cell MM, is configured to be able to communicate with the MM base station in addition to the macro base station. Thus, performing communications concurrently using a plurality of radio communication systems with different usage frequencies is also called Link aggregation. In addition, the user terminal in this Embodiment includes a mobile terminal apparatus and fixed terminal apparatus.

In the network configuration as shown in FIG. 1, the macro base station and MM base station are connected to a central control station (CC). The central control station is connected to a core network. For example, the central control station includes an access gateway apparatus, Radio Network Controller (RNC), Mobility Management Entity (MME) and the like. In addition, such a configuration may be made where a part or the whole of functions of the central control station are provided in the macro base station.

In the configuration as shown in FIG. 1, for example, a C (Control)-plane for handling control messages is supported by the macrocell M. On the other hand, a U (User)-plane for handling user data is supported by the Massive-MIMO cell MM. Further, in the configuration as shown in FIG. 1, it is possible to operate the macrocell M and Massive-MIMO cell MM with different frequency bands. For example, it is possible to operate the C-plane supported by the macrocell M with a low-frequency band (for example, 2 GHz-band), and operate the U-plane supported by the Massive-MIMO cell MM with a high-frequency band (for example, 10 GHz-band).

Further, as shown in FIG. 1, when the user terminal is capable of connecting to both the macro base station and the MM base station, it is possible to split the C-plane and the U-plane to control. For example, the macro base station transmits control information required for reception of user data (data signal) to the user terminal, while the MM base station is capable of transmitting the user data. Further, while the macro base station transmits a part of control information, the MM base station is capable of transmitting the rest of the control information and user data.

In the configuration of the future radio communication network, it is considered that the existing system (LTE/LTE-A and the like) is applied as the wide-area cell (macrocell) in FIG. 1, and that the user terminal concurrently connects to the macro base station and MM base station to communicate. In LTE/LTE-A, as a multi-access scheme, in downlink is used a scheme based on OFDMA (Orthogonal Frequency Division Multiple Access), and in uplink is used a scheme based on SC-FDMA (Single Carrier Frequency Division Multiple Access). Further, in LTE/LTE-A, as a baseband configuration, the sampling frequency is 30.72 MHz, the number of FFT points (the number of subcarriers) is 2048, the subcarrier interval is 15 kHz, and the transmission bandwidth ranges from 1.4 MHz to 20 MHz (see FIG. 2). In addition, the transmission bandwidth is determined corresponding to the number of used subcarriers.

On the other hand, in the system of Massive-MIMO cell (hereinafter, also described as "MM cell") using a high-frequency band, it is assumed to make a configuration for supporting a plurality of bandwidths as necessary. For example, in the MM cell, it is considered using a plurality of frequency bands (for example, bands of 5 GHz to 40 GHz), and an occupation bandwidth (for example, 100 MHz to 1000 MHz) corresponding to each frequency band. In this case, the user terminal and MM base station select a bandwidth/frequency band to use as necessary to communicate.

Thus, when the user terminal supports a plurality of bandwidths, the terminal needs to be provided with circuits corresponding to respective bandwidths. Further, as shown in FIG. 1, when the user terminal connects to the macrocell using the existing system (for example, LTE/LTE-A and the like), and the MM cell to perform communications in a high-frequency band by the Massive-MIMO transmission scheme, the terminal needs to be provided with circuits corresponding to respective radio schemes (for example, radio frame configuration). By this means, the circuit scale of the user terminal is increased, and the risk is considered that transmission/reception processing is complicated.

Therefore, in the system using the MM cell, by making a circuit configuration and radio frame configuration of the user terminal and/or MM base station extended and common to the existing system (for example, LTE/LTE-A), the inventors of the present invention found out that it is possible to suppress complication of the transmission/reception processing, and suitably actualize that the user terminal supports a plurality of bandwidths and concurrently connects to a plurality of systems.

More specifically, it was found out that using, as a reference signal, a sampling frequency of a baseband circuit of the other macrocell (for example, LTE/LTE-A) to concurrently connect, a frequency subjected to frequency conversion by predetermined times (n/m times) is used as a sampling frequency of a baseband circuit of the MM cell (n and m are integers, respectively.) Further, it was found out that the frame configuration (for example, subcarrier interval and subframe length of an OFDM signal) of the MM cell is changed from the frame configuration of the other macrocell to concurrently connect based on the n/m.

This Embodiment will be described below with reference to drawings. In the following description, as the existing system, LTE/LTE-A is described as an example, but the existing system for enabling concurrent connection with the MM cell is not limited thereto. Further, in the following drawings, it is intended to mainly show the macro base station (MeNB), MM base station (MMeNB) and user terminal (UE), and configurations (for example, central control station and the like) unnecessary for the description are omitted. Further, the UE is assumed as equipment capable of connecting to the MeNB and MMeNB.

Moreover, the radio base station according to this Embodiment is not limited to the MM base station, and may be a small base station for forming a small cell and the like. Further, the radio base station for forming the wide-area cell is also not limited to the macro base station. Furthermore, the wide-area cell and narrow-area cell according to this Embodiment are assumed to be different in the usage frequency, and may have the same frequency.

(Aspect 1)

In Aspect 1, the case is described where a sampling frequency (fs) of a baseband signal (baseband circuit) in the MM cell is determined by using a sampling frequency of the existing system to concurrently connect as a reference signal. In the following description, the "sampling frequency of the baseband signal" is also simply described as "sampling frequency".

More specifically, using a sampling frequency of the other system (for example, LTE/LTE-A) to concurrently connect as a reference signal, the frequency is converted by predetermined times, and the resultant is used as a sampling frequency (fs) used in the baseband circuit of the user terminal and/or MM base station in the MM cell. As the sampling frequency of the MM cell, for example, using the sampling frequency (30.72 MHz) of LTE/LTE-A as a reference signal, as shown in the following equation (1), the frequency subjected to n/m-times frequency conversion is used as the sampling frequency of the MM cell (see FIG. 3A).

$$fs = 30.72 \times (n/m) \text{ MHz} \qquad \text{Eq. (1)}$$

n and m are integers

For example, by varying n and m (n/m) as appropriate, it is possible to set a plurality of sampling frequencies used in the MM cell. Further, by assigning respective different transmission bandwidths corresponding to the sampling frequencies, it is possible to support a plurality of bandwidths corresponding to n and m (n/m) (see FIG. 3B).

Figures 3A, 3B:
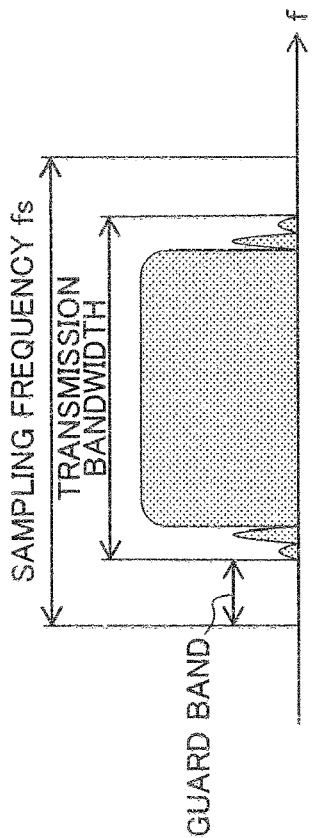
FIG. 3 contains diagrams to explain sampling frequencies and transmission bandwidths used in an MM cell according to this Embodiment.

In FIG. 3B, in the case where n/m is "4", the sampling frequency in the MM cell is 122.88 MHz, and it is possible to make a configuration for supporting 100 MHz as a transmission bandwidth. Similarly, in the case where n/m is "8", "16", "20" or "32", the sampling frequency in the MM cell is 245.76 MHz, 491.52 MHz, 614.4 MHz or 983.04 MHz, respectively, and it is possible to make a configuration for supporting 200 MHz, 400 MHz, 500 MHz or 1000 MHz as a transmission bandwidth, respectively. In addition, the correspondence among n/m, fs and transmission bandwidth shown in FIG. 3B is one example, and this Embodiment is not limited thereto.

Thus, in the case where the MM cell supports a plurality of bandwidths, by setting a plurality of sampling frequencies and a plurality of transmission bandwidths using a sampling frequency of the existing system to concurrently connect as a reference signal, it is possible to suppress complication of the transmission/reception processing with increase in the circuit scale of the user terminal. One example of transmitter and receiver applied in this Embodiment will be described below with reference to drawings. In addition, a part or the whole of configurations of the following transmitter and receiver are capable of being applied to the user terminal and the MM base station.

Figure 4:
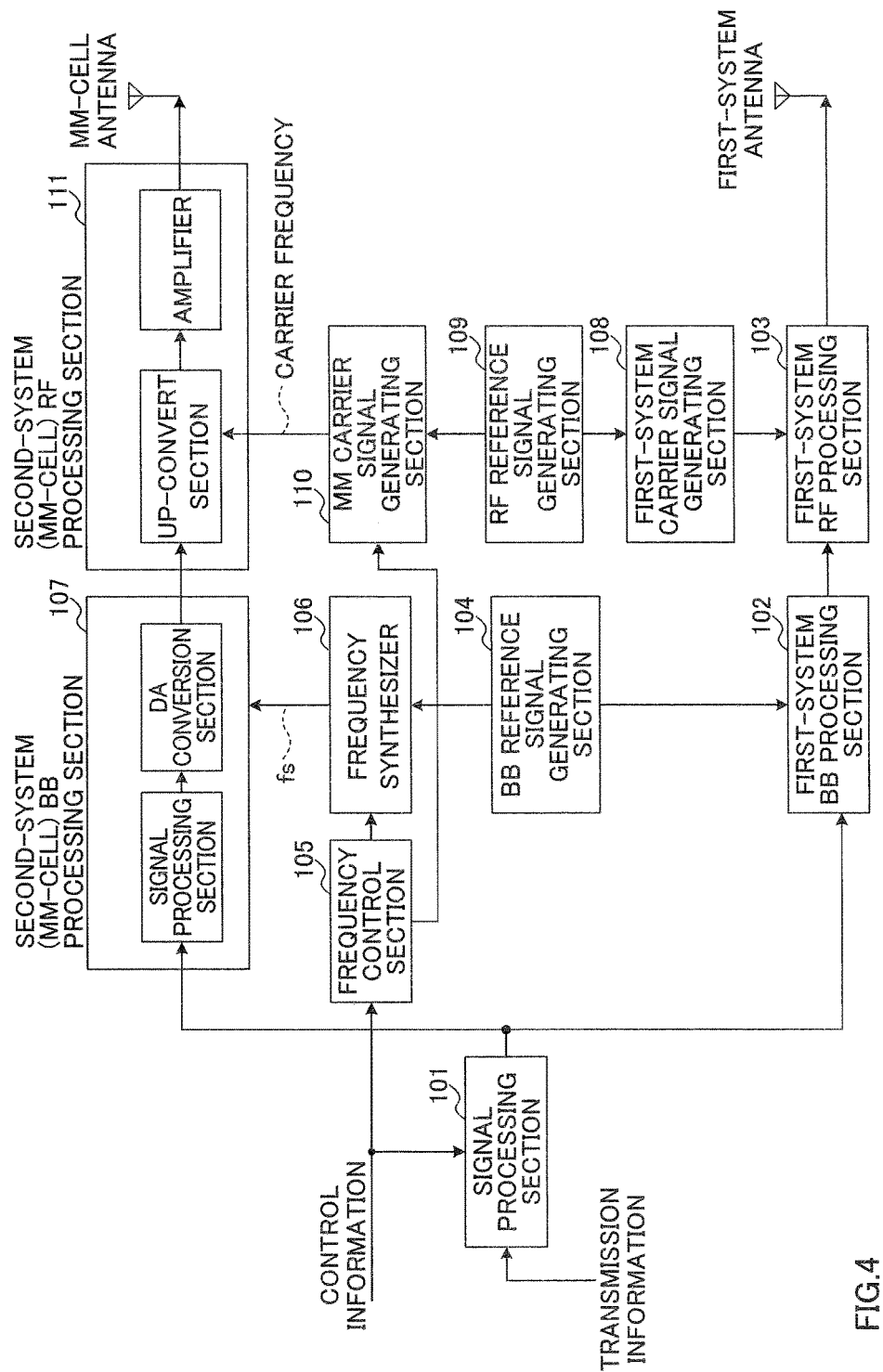
FIG. 4 is a block diagram showing one example of a configuration of a transmitter according to this Embodiment.
Figure 5:
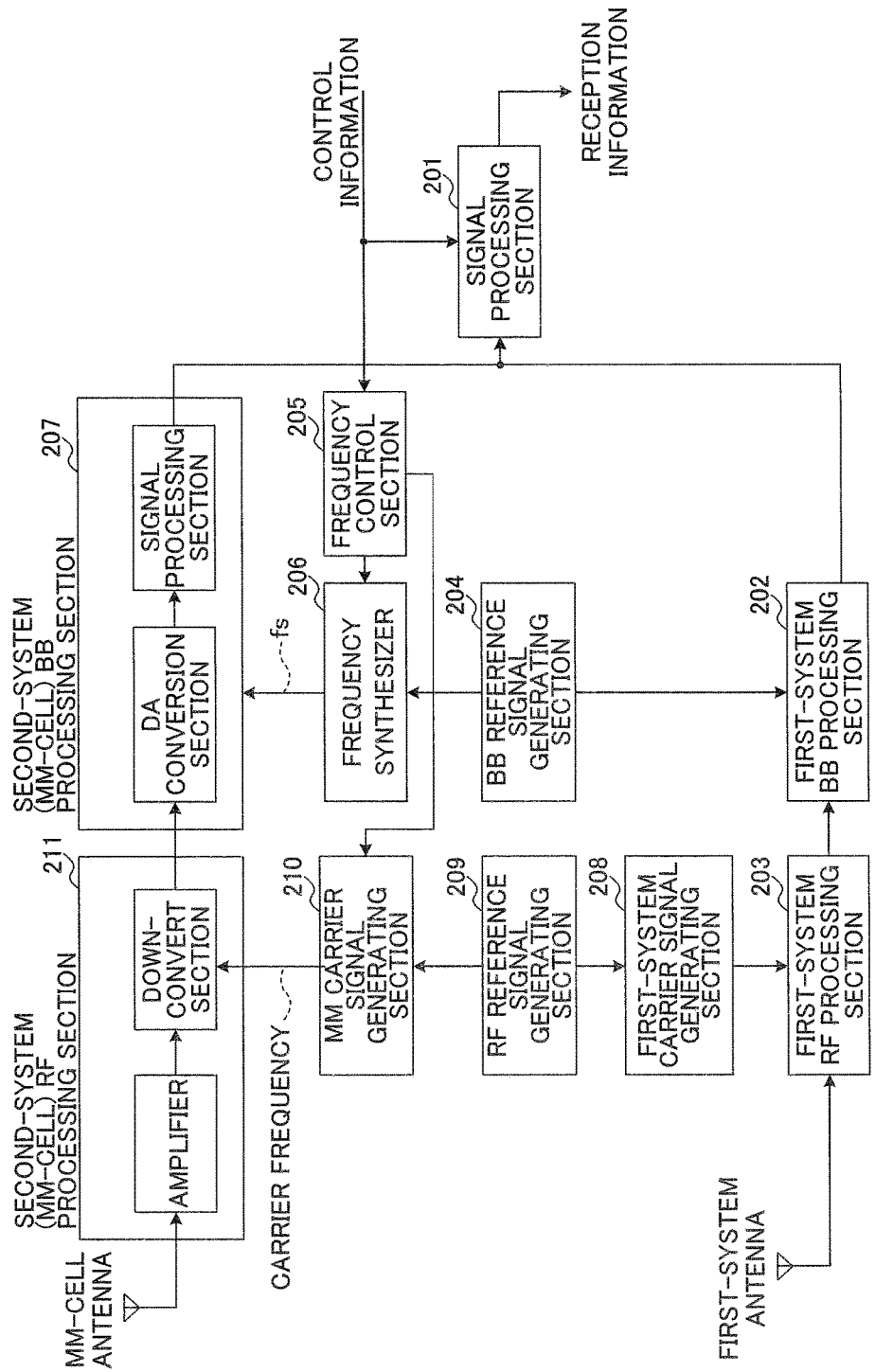
FIG. 5 is a block diagram showing one example of a configuration of a receiver according to this Embodiment.

FIG. 4 is a diagram showing one example of a circuit configuration of the transmitter in this Embodiment. Further, FIG. 5 is a diagram showing one example of a circuit configuration of the receiver in this Embodiment. The following description is given, while assuming a user terminal capable of concurrently connecting to the MM cell and macrocell as the transmitter/receiver, but this Embodiment is not limited thereto. As described above, it is possible to provide the configurations of the transmitter and receiver in the MM base station.

As shown in FIG. 4, the transmitter has a signal processing section 101, first-system BB processing section 102, first-system RF processing section 103, BB reference signal generating section 104, frequency control section 105, frequency synthesizer 106, second-system (MM-cell) BB processing section 107, first-system carrier signal generating section 108, RF reference signal generating section 109, MM carrier signal generating section 110, and second-system (MM-cell) RF processing section 111.

The signal processing section 101 determines which system (first system or second system) transmits transmission information transmitted from the transmitter (for example, user terminal) to output to the first-system BB processing section 102 and second-system BB processing section 107. Herein, the case is assumed where the existing system (LTE/LTE-A) is used as the first system, and the system having the MM cell is used as the second system. The signal processing section 101 determines the information to transmit in the existing system and the information to transmit in the MM cell, and respectively outputs the information to the baseband (BB) processing sections corresponding to respective systems.

The first-system BB processing section 102 performs baseband processing on a signal to transmit in the first system. For example, the section 102 performs coding processing of the signal and the like, using a frequency (for example, 30.72 MHz) that is a reference signal for baseband of the existing system. The reference signal for baseband is output from the BB reference signal generating section 104. More specifically, the first-system BB processing section 102 codes a data signal into a baseband signal to output to the first-system RF processing section 103.

The first-system RF processing section 103 performs modulation processing of the signal and the like, using a carrier frequency output from the first-system carrier signal generating section 108. More specifically, the first-system RF processing section 103 modulates the baseband signal output from the first-system BB processing section 102 to output to a first-system antenna (transmission/reception section).

The BB reference signal generating section 104 generates a reference signal (sampling frequency reference signal) to generate the sampling frequency (for example, 30.72 MHz) for baseband of the first system (existing system). For generation of the reference signal, for example, it is possible to use a quartz oscillator. The generated BB reference signal is output to the first-system BB processing section 102 and frequency synthesizer 106.

The frequency control section 105 controls a frequency to transmit in the MM cell. In this Embodiment, as a sampling frequency (fs) of the baseband circuit of the MM cell, using the sampling frequency of the existing system (for example, LTE/LTE-A) as a reference signal, the frequency is converted by (n/m) times and used (see the above-mentioned equation (1) and FIG. 3). Accordingly, the frequency control section 105 outputs information on n and m (or n/m) to the frequency synthesizer 106, while outputting information on frequency band/transmission bandwidth used in the MM cell to the MM carrier signal generating section 110. In addition, as the information on n and m (or n/m), a beforehand set value may be used, or the frequency control section 105 is capable of acquiring from the outside as control information.

The frequency synthesizer 106 performs frequency conversion processing on the sampling frequency reference signal output from the BB reference signal generating section 104. More specifically, based on the information on n and m (or n/m) notified from the frequency control section 105, using the sampling frequency (for example, 30.72 MHz) of the first system as a reference signal, the synthesizer 106 converts the frequency by n/m times. Then, the frequency synthesizer 106 outputs the frequency-converted sampling frequency (fs) to the second-system (MM-cell) BB processing section 107. In other words, the frequency synthesizer 106 functions as a frequency adjusting section.

The second-system (MM-cell) BB processing section 107 performs baseband processing (signal processing, D/A conversion and the like) on the information to transmit in the second system. For example, using the frequency (fs) that is the reference signal for baseband of the MM cell, the section 107 performs coding processing of the signal and the like. More specifically, the second-system BB processing section 107 codes a data signal into a baseband signal to output to the second-system (MM-cell) RF section 111. Moreover, the second-system BB processing section 107 performs processing such as assignment of the signal to transmit to radio resources.

The RF reference signal generating section 109 generates a reference signal (carrier frequency reference signal) used in generation of a carrier frequency. For generation of the reference signal, for example, it is possible to use a quartz oscillator. The generated carrier frequency reference signal is output to the first-system carrier signal generating section 108 and MM carrier signal generating section 110.

Based on the carrier frequency reference signal output from the RF reference signal generating section 109, the first-system carrier signal generating section 108 generates a frequency (carrier frequency) of a carrier signal for the first system to output to the first-system RF processing section 103.

Based on the carrier frequency reference signal output from the RF reference signal generating section 109, the MM carrier signal generating section 110 generates a frequency (carrier frequency) of a carrier signal for the MM to output to the second-system (MM-cell) RF processing section 111.

Using the carrier frequency output from the MM carrier signal generating section 110, the second-system (MM-cell) RF processing section 111 performs RF processing (up-convert, signal amplification, modulation and the like). More specifically, the second-system (MM-cell) RF processing section 111 modulates the baseband signal output from the second-system BB processing section 107 to output to an MM-cell antenna (transmission/reception section).

In addition, in FIG. 4, a configuration may be made where the BB reference signal generating section 104 and RF reference signal generating section 109 are provided as a common section. For example, the BB reference signal generating section 104 and RF reference signal generating section 109 are made a common section as a reference signal generating section, and in addition to the baseband circuit, the RF circuit is also capable of using the sampling frequency (for example, 30.72 MHz) of the existing system as a reference signal. By this means, it is possible to decrease the number of reference signal generating sections, and it is possible to reduce the circuit scale of the transmitter (user terminal and/or MM base station).

On the other hand, as shown in FIG. 5, the receiver has a signal processing section 201, first-system BB processing section 202, first-system RF processing section 203, BB reference signal generating section 204, frequency control section 205, frequency synthesizer 206, second-system (MM-cell) BB processing section 207, first-system carrier signal generating section 208, RF reference signal generating section 209, MM carrier signal generating section 210, and second-system (MM-cell) RF processing section 211.

The RF reference signal generating section 209 generates a reference signal (carrier frequency reference signal) used in generation of a carrier frequency. For generation of the reference signal, for example, it is possible to use a quartz oscillator. The generated carrier frequency reference signal is output to the first-system carrier signal generating section 208 and MM carrier signal generating section 210.

Based on the carrier frequency reference signal output from the RF reference signal generating section 209, the first-system carrier signal generating section 208 generates a frequency (carrier frequency) of a carrier signal for the first system to output to the first-system RF processing section 203.

Based on the carrier frequency reference signal output from the RF reference signal generating section 209, the MM carrier signal generating section 210 generates a frequency (carrier frequency) of a carrier signal for the MM to output to the second-system (MM-cell) RF section 211.

Using the carrier frequency output from the MM carrier signal generating section 210, the second-system (MM-cell) RF section 211 performs RF processing (signal amplification, down-convert, demodulation processing and the like). More specifically, the second-system (MM-cell) RF processing section 211 demodulates a data signal received in the MM-cell antenna into a baseband signal to output to the second-system (MM-cell) BB processing section 207.

The first-system RF processing section 203 performs modulation of the signal and the like, using a carrier frequency output from the first-system carrier signal generating section 208. More specifically, the first-system RF processing section 203 demodulates a data signal received in the first-system antenna into a baseband signal to output to the first-system BB processing section 202.

The BB reference signal generating section 204 generates a reference signal (sampling frequency reference signal) to generate the sampling frequency (for example, 30.72 MHz) for baseband of the first system (existing system). For generation of the reference signal, for example, it is possible to use a quartz oscillator. The generated BB reference signal is output to the first-system BB processing section 202 and frequency synthesizer 206.

The first-system BB processing section 202 performs baseband processing on information to transmit in the first system. For example, the section 102 performs coding of the signal and the like, using the frequency (for example, 30.72 MHz) that is a reference signal for baseband of the existing system. The reference signal for baseband is output from the BB reference signal generating section 204. More specifically, the first-system BB processing section 202 decodes a baseband signal output from the first-system RF processing section 203 into a data signal to output.

The frequency control section 205 controls a frequency to receive in the MM cell. As described above, in this Embodiment, as the sampling frequency (fs) of the MM cell, using the sampling frequency of the existing system as a reference signal, the frequency is converted by n/m times. Accordingly, the frequency control section 205 outputs information on n and m (or n/m) to the frequency synthesizer 206, while outputting information on frequency band/transmission bandwidth used in the MM cell to the MM carrier signal generating section 210. In addition, as the information on n and m (or n/m), a beforehand set value may be used, or the frequency control section 205 is capable of acquiring from the outside as control information.

The frequency synthesizer 206 performs frequency conversion processing on the sampling frequency reference signal output from the BB reference signal generating section 204. More specifically, based on the information on n and m (or n/m) notified from the frequency control section 205, using the sampling frequency (for example, 30.72 MHz) of the first system as a reference signal, the synthesizer 206 converts the frequency by predetermined times. Then, the frequency synthesizer 206 outputs the sampling frequency (fs) of the baseband signal in the MM cell to the second-system (MM-cell) BB processing section 207. In other words, the frequency synthesizer 206 functions as a frequency adjusting section.

The second-system (MM-cell) BB processing section 207 performs baseband processing (signal processing, D/A conversion and the like) on the information to transmit in the second system. For example, using the frequency (fs) that is the reference signal for baseband of the MM cell, the section 207 performs decoding processing of the signal and the like. More specifically, the second-system BB processing section 207 decodes a baseband signal output from the second-system (MM-cell) RF section 211 into a data signal to output.

The signal processing section 201 performs signal processing on data signals output from the first-system BB processing section 202 and second-system BB processing section 207 to acquire reception information. Herein, the case is assumed where the existing system (LTE/LTE-A) is used as the first system, and the system having the MM cell is used as the second system. Therefore, the signal processing section 201 is capable of concurrently receiving the signal transmitted in the existing system and the signal transmitted in the MM cell.

Thus, in Aspect 1, in the transmitter and receiver applied in the MM cell, using the sampling frequency of the baseband circuit of the other cell (for example, macrocell) to concurrently connect as a reference signal, the frequency subjected to frequency conversion by n/m times is used as the sampling frequency of the baseband circuit of the MM cell. By this means, even in the case where the MM cell supports a plurality of bandwidths, and the case of concurrently connecting to the MM cell and the macrocell using the existing system, it is possible to suppress increase in the circuit scale of the user terminal, and it is possible reduce the load on the transmission/reception processing.

(Aspect 2)

In Aspect 2, the case is described where a radio frame configuration in the MM cell is made common in consideration of the existing system (for example, LTE/LTE-A), and a part of the configuration is changed corresponding to n/m. More specifically, based on n/m in the above-mentioned Aspect 1, a frame configuration (for example, subcarrier interval, subframe length and the like of an OFDM signal) of the MM cell is changed from the frame configuration of the other cell to concurrently connect.

As described above, in LTE/LTE-A, as a multi-access scheme, in downlink is used the scheme based on OFDMA, and in uplink is used the scheme based on SC-FDMA. Further, in LTE/LTE-A, as a baseband configuration, the sampling frequency is 30.72 MHz, the number of FFT points (the number of subcarriers) is 2048, the subcarrier interval is 15 kHz, and the transmission bandwidth ranges from 1.4 MHz to 20 MHz (see FIG. 2).

Herein, in this Embodiment, as the radio frame configuration in the MM cell, the scheme based on OFDMA is used in downlink, the scheme based on SC-FDMA is used in uplink, and a part of the frame configuration is changed based on m/m. For example, as the radio frame configuration of the MM cell, the number of subcarriers is set at "2048" that is the same as the maximum value of the existing system (for example, LTE/LTE-A). By this means, it is possible to apply the same signal processing section as in the existing system. On the other hand, corresponding to the sampling frequency fs applied in the MM cell, the subcarrier interval (Δf) is changed.

More specifically, as a subcarrier configuration of the MM cell, in the case of performing predetermined-times (n/m-times) frequency conversion on the sampling frequency of the existing system, the subcarrier interval (Δf) is also increased by n/m times (following equation (2)). In other words, in the MM cell, the number of subcarriers is made constant, and the subcarrier interval is changed corresponding to the sampling frequency.

$$\Delta f = fs/2048$$

$$fs = 30.72 \times (n/m) \text{ MHz} \quad \text{Eq. (2)}$$

n and m are integers

Further, in this Embodiment, the radio frame length in the MM cell is defined to be different from that in the existing system. More specifically, the radio frame length in the MM cell is made the same as the subframe length (1 ms) of the existing system (LTE/LTE-A) (see FIG. 6A). By this means, in the MM cell, it is possible to make the frame length shorter than in the existing system, and therefore, it is possible to transmit and receive data signals efficiently.

In this case, it is possible to determine the subframe length ($t_{SF}$) of the MM cell, based on the sampling frequency (for example, n/m) used in the MM cell. For example, in the case of FFD where different frequencies are used in UL and DL, it is possible to set the subframe length ($t_{SF}$) of the MM cell at 1/(n/m) of the subframe length (1 ms) of the existing system. Further, in the case of TDD where the same frequency is used in UL and DL, it is possible to set the subframe length ($t_{SF}$) of the MM cell at 2/(n/m) of the subframe length (1 ms) of the existing system (twice of FDD). In other words, it is possible to set the number of subframes of the MM cell at (n/m) in the case of FDD, and it is possible to set the number of subframes of the MM cell at (n/m)/2 in the case of TDD (see FIG. 6B).

Figures 6A, 6B:
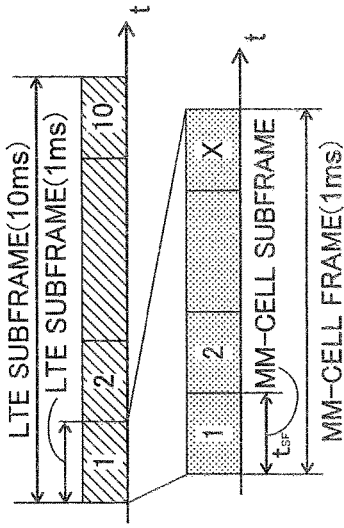
FIG. 6 contains diagrams to explain a frame configuration of the MM cell according to this Embodiment.

Thus, in the MM cell, the sampling frequency (fs) is changed to an n/m-times frequency with respect to the existing system, and based on n/m, the frame configuration (for example, subcarrier interval, subframe length and the like of the OFDM signal) is also changed. FIG. 6B shows one example of the radio frame configuration changed based on n/m.

When n/m is "4", corresponding to the n/m, it is possible to determine the sampling frequency, subcarrier interval ($\Delta f$), FDD subframe length ($t_{SF\_FDD}$), the number of FDD subframes, TDD subframe length ($t_{SF\_TDD}$), and the number of TDD subframes in the MM cell from the frame configuration of the existing system. More specifically, it is possible to set the sampling frequency and subcarrier interval ($\Delta f$) in the MM cell at 4 times the existing system. Further, it is possible to set the FDD subframe length ($t_{SF\_FDD}$) at 250 μs (1 ms/4), the number of FDD subframes at "4", the TDD subframe length ($t_{SF\_TDD}$) at 500 μs, and the number of TDD subframes at twice the number in FDD.

Similarly, also when n/m is "8", "16", "20" or "32", corresponding to the value of n/m, it is possible to determine the sampling frequency, subcarrier interval ($\Delta f$), FDD subframe length ($t_{SF\_FDD}$), the number of FDD subframes, TDD subframe length ($t_{SF\_TDD}$), and the number of TDD subframes in the MM cell. In addition, the example as shown in FIG. 6B is one example, and the invention is not limited thereto. It is possible to design the frame configuration in the MM cell as appropriate corresponding to n/m.

Figure 7A:
FIG. 7 contains diagrams to explain the frame configuration of the MM cell according to this Embodiment.

FIG. 7 shows one example of frame configurations of FDD and TDD applied in the MM cell when n/m is "16". In addition, FIG. 7A illustrates the frame configuration of LTE as the existing system. In LTE, one radio frame (10 ms) is comprised of 10 subframes (each 1 ms).

Figure 7B:
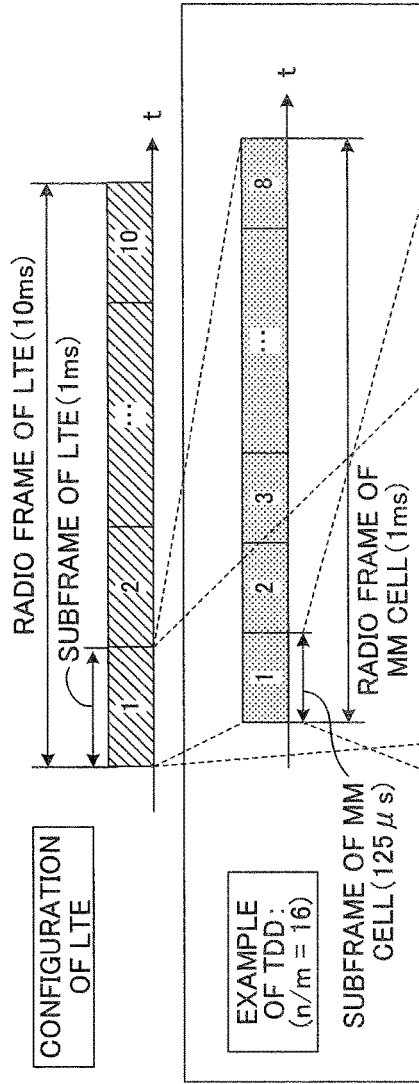

FIG. 7B shows one example of the frame configuration of TDD in the MM cell. Herein, the case is shown where the number of TDD subframes is set at "8" corresponding to one subframe of LTE. In other words, a radio frame (1 ms) of TDD in the MM cell is comprised of 8 subframes where each subframe length ($t_{SF\_FDD}$) is 125 μs.

Further, in one subframe of TDD in the MM cell, it is possible to set one or both of UL and DL. FIG. 7B illustrates the case where one subframe (125 μs) of the MM cell is provided with both of UL and DL. By providing one subframe with UL and DL, it is possible to acquire the channel state information (CSI) with ease using channel reciprocity. Further, in the case of providing one subframe with UL and DL, it is possible to assign control channels and data channels to UL and DL. In this case, it is necessary to provide a guard time between UL and DL and between a subframe and the next subframe.

Figure 8A:
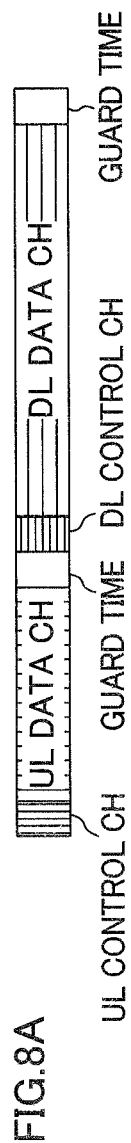
FIG. 8 contains diagrams to explain a subframe configuration in TDD of the MM cell according to this Embodiment.
Figure 8B:
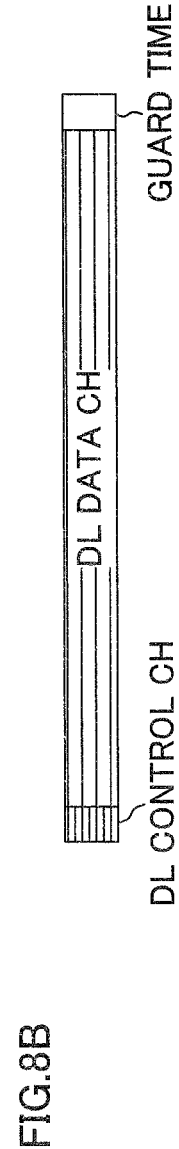
Figure 8C:
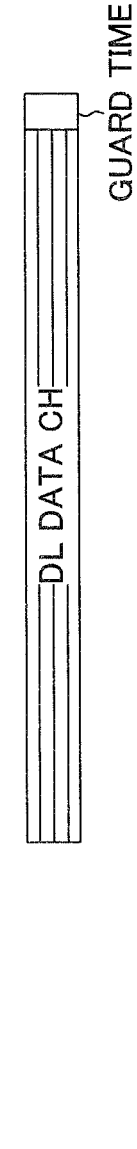

Furthermore, as well as the configuration as shown in FIG. 7B, a configuration may be made where one subframe is provided with one of UL and DL, and another configuration may be made where control channels are aggregated to a predetermined subframe (see FIG. 8). As in FIG. 7A, FIG. 8A illustrates the case where one subframe is provided with UL and DL, and a control channel is assigned to each of UL and DL. FIG. 8B illustrates the case where one subframe is provided with one (herein, DL), and a control channel is assigned to a first region of DL. FIG. 8C illustrates the case where one subframe is provided with one (herein, DL), and any control channel is not assigned. In FIG. 8C, it is possible to assign the control channel corresponding to the DL subframe to another subframe.

Still furthermore, as the ratio of DL/UL configuration of each subframe, the DL/UL configuration defined in TDD of the existing system may be used, the ratio of DL/UL configuration may be defined separately, and it is possible to control dynamically. Thus, it is possible to adaptively control the ratio of UL/DL configuration, and the number of symbols of the control channel and data channel assigned to each subframe, corresponding to a communication environment and the like.

For example, it is possible to design the frame configuration of a TDD subframe based on the frame configuration (FIG. 6B) determined in association with n/m and communication circumstances. For example, it is possible to design using the following design standard.

Subframe length ($t_{SF\_TDD}$) when being comprised of DL and UL≈(FFT signal length+CP length)×(the number of data channel symbols+the number of control channel symbols)+guard time×2

In the above-mentioned design standard, as the CP length, guard time length, the number of guard times, the number of control channel symbols and the like, suitable parameters are determined corresponding to the system (communication environment and the like). For example, as the guard time, in the case where one subframe is comprised of both of UL and DL, two guard times are considered, and in the case where one subframe is comprised of one of UL and DL, one guard time is designed.

For example, FIG. 9 illustrates one example of the case of designing the subframe configuration of TDD of the MM cell when n/m is "16". Herein, it is possible to determine the FFT signal length and TDD subframe length corresponding to n/m, and further determine the CP length, the number of symbols of the data channel, the number of symbols of the control channel, and the guard time corresponding to the system as described below.

$$125 = (4.17 + 0.5) \times (22 + 2 + 2) + 1.8 \times 2$$

In addition, the above-mentioned design example is one example, and this Embodiment is not limited thereto. Further, based on the subframe configuration determined corresponding to n/m, the user terminal and MM base station are capable of controlling assignment of signals and the like.

Figure 7C:
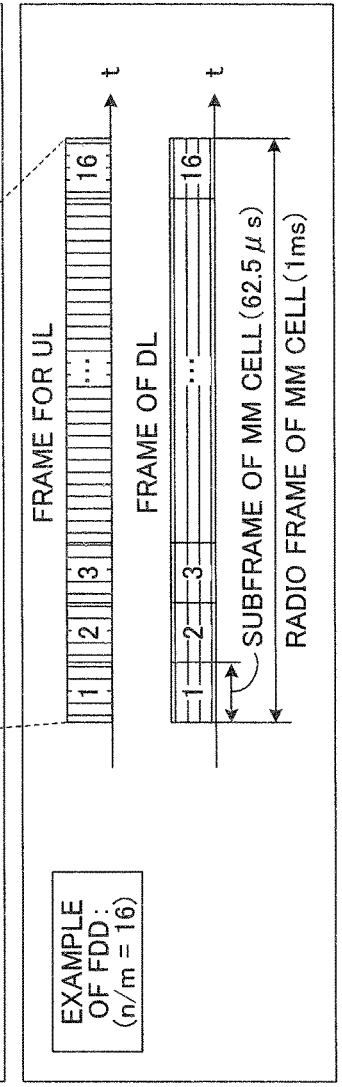

FIG. 7C shows one example of the frame configuration of FDD in the MM cell. Herein, since n/m is "16", the number of subframes of FDD in the MM cell is set at "16" in each of UL and DL. In other words, the radio frame (1 ms) of FDD is comprised of 16 MM-cell subframes where each subframe length ($t_{SF\_TDD}$) is 62.5 µs.

Thus, by making the radio frame configuration in the MM cell common in consideration of the existing system (For example, LTE/LTE-A), and changing a part of the configuration corresponding to n/m, even in the case where the user terminal concurrently connects to the existing system and another system having the MM cell, it is possible to suppress increase in the circuit scale of the user terminal, and it is possible to reduce the load on the transmission/reception processing. Further, by achieving commonality of frame configurations in the macrocell and MM cell, it is possible to perform diversity (Multi-RAT diversity) transmission between different cells. For example, in the case of performing information retransmission (HARQ) in the macrocell using LTE/LTE-A by using the MM cell, it is possible to transmit one subframe of the macrocell as one frame of the MM cell, the transmission speed of the MM cell is higher than that of the macrocell, and it is thereby possible to perform information retransmission of the macrocell at high speed.

(Aspect 3)

Aspect 3 describes the case of grouping a plurality of subcarriers to perform multicarrier transmission.

Figure 2:
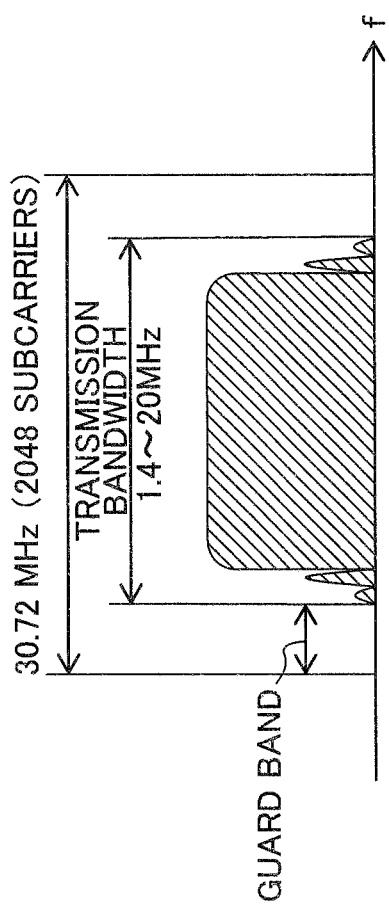
FIG. 2 is a schematic explanatory diagram of baseband in LTE/LTE-A.

As shown in FIG. 2, when the number of all FFT points (the number of subcarriers) is "2048", the number of subcarriers with respect to the transmission band is "1667". In this case, the number of FFT points with respect to the transmission band is not the power of "2", it is not possible to use Fast Fourier Transform (FFT), and processing with Discrete Fourier Transform (DFT) is required. However, the load (processing amount) in the DFT processing is large, as compared with the FFT processing, and therefore, there is a problem that the processing time increases.

Therefore, the inventors of the present invention found out that a plurality of subcarriers is grouped, and that subcarriers of the same group transmit the same information to take advantage of single carrier and multicarrier. Particularly, by decreasing the number of groups (i.e. increasing the number of subcarriers to transmit the same information), it is possible to reduce PAPR (Peak to Average Power Ratio). Further, by adjusting grouping with respect to each subcarrier, it is possible to perform digital filtering and calibration of frequency characteristics.

Figure 10A:
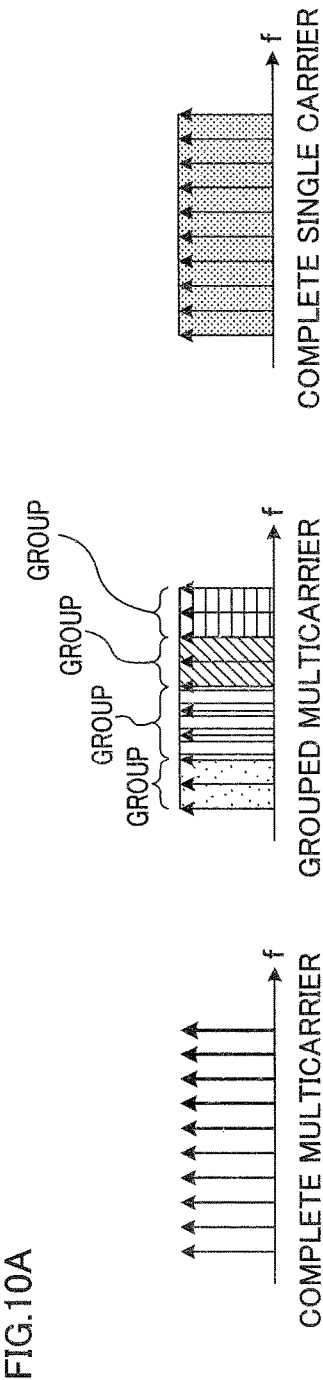
FIG. 10 contains diagrams showing one example of grouped multicarrier transmission according to this Embodiment.

FIG. 10A is a schematic diagram for complete multicarrier transmission, grouped multicarrier transmission, and complete single carrier transmission. In this Embodiment, grouped multicarrier transmission is performed where a plurality of subcarriers is grouped to transmit. More specifically, in order to support grouped subcarrier transmission, FFT or DFT processing sections with the different numbers of points are provided, and corresponding to the grouped configuration, the FFT processing and DFT processing is combined and applied (see FIG. 10B).

It is possible to determine the configurations of the set FFT processing section and DFT processing section based on the number of all subcarriers (for example, "1667"), and assumable grouping configuration. For example, as the FFT processing section, prepared are processing sections that respectively correspond to 64 points, 128 points, 512 points, and 1024 points. Further, as the DFT processing section, it is possible to prepare processing sections that respectively correspond to 19 points and 3 points. Particularly, it is preferable to provide as many FFT processing sections as possible and perform the DFT processing on remaining FFT points.

Thus, by grouping a plurality of subcarriers to perform multicarrier transmission (grouped multicarrier transmission), it is possible to suppress increase in processing time, irrespective of the number of subcarriers with respect to the transmission band.

Figure 10B:
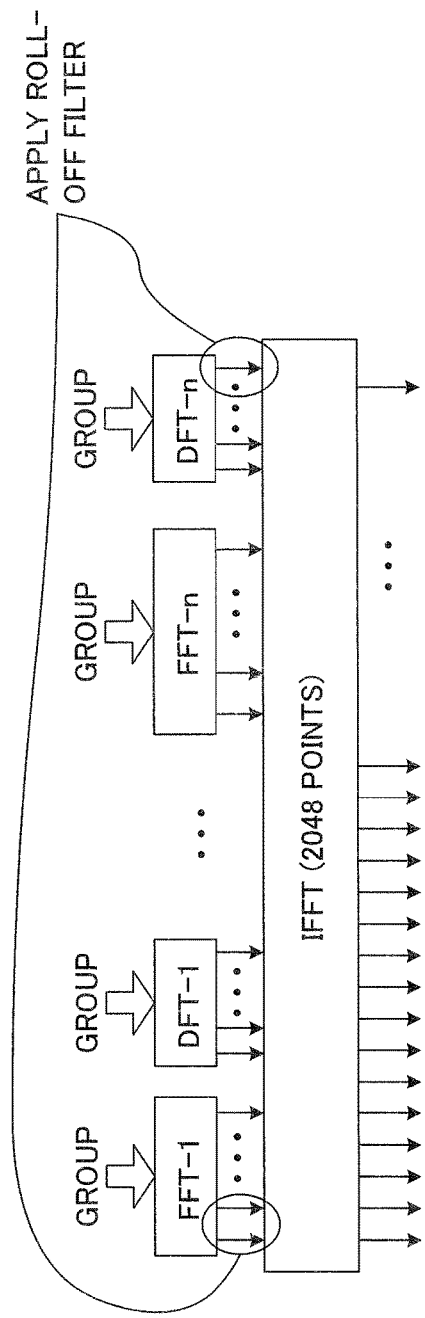

Further, in the case of performing grouped multicarrier transmission, it is preferable to apply roll-off filters to both sides of the frequency domain (see FIG. 10B). By such digital filtering, it is possible to decrease out-of-band radiation and effectively use the band.

When frequency selectively exists in a propagation path, inside subcarriers to group, by adjusting a parameter of grouping and transmission power of each group so that frequency characteristics of the propagation path are flat, it is possible to perform calibration of frequency characteristics of the propagation path.

Alternatively, pseudo DFT processing using the FFT processing may be performed in both sides of the frequency domain. Since an output signal of the FFT processing has periodicity, it is possible to make DFT of a pseudo large size using the FFT section (for example, 64 points) of a small size. For example, as shown in FIG. 11, it is possible to perform pseudo DFT on DFT of 80 points using the FFT processing of 64 points that is the nearest size.

Figure 11:
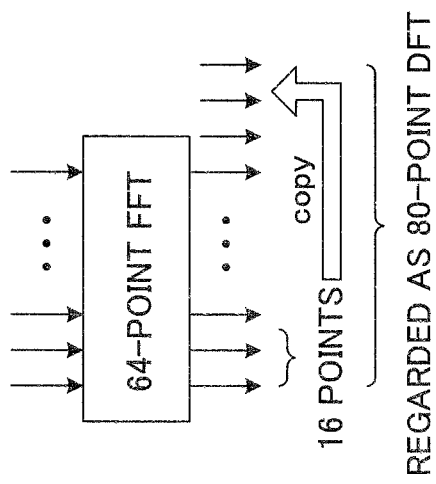
FIG. 11 is a diagram to explain one example of FFT processing according to this Embodiment.
Figure 11:
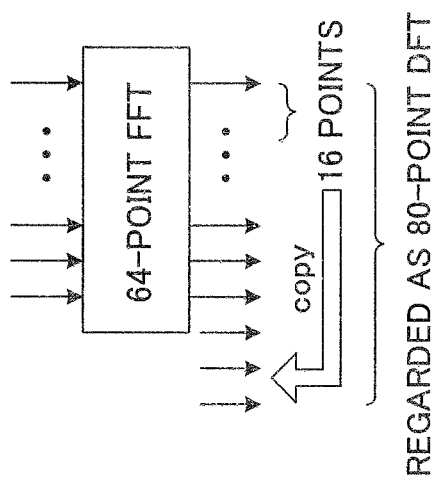

In FIG. 11, the FFT processing section of 64 points is set in both sides of the frequency domain, inner 16 points inside 64 points are copied and provided outside, and it is thereby possible to regard as DFT processing of 80 points to perform processing. By this means, even when the number of FFT points is not the power of "2", by performing Fast Fourier Transform (FFT), it is possible to reduce the processing time.

In addition, the present invention is not limited to the above-mentioned Embodiment, and is capable of being carried into practice with various modifications thereof. For example, without departing from the scope of the invention, the number of processing sections, processing procedure and the like in the above-mentioned description are capable of being carried into practice with modifications thereof as appropriate. Moreover, the invention is capable of being carried into practice with modifications thereof as appropriate without departing from the scope of the invention.

The present application is based on Japanese Patent Application No. 2013-212300 filed on Oct. 9, 2013, entire content of which is expressly incorporated by reference herein.

The invention claimed is:

1. A user terminal that communicates with a radio base station for forming a wide-area cell and another radio base station for forming a narrow-area cell in a radio communication system where the narrow-area cell is provided inside the wide-area cell, comprising:

a processor and a memory, wherein
the processor generates a sampling frequency of a baseband signal of the wide-area cell as a reference signal;
converts a frequency of the reference signal by n/m times, where n is the length of a subframe of the wide-area cell and m is the length of a subframe of the narrow-area cell when the narrow-area cell applies FDD; and
uses a frequency subjected to frequency conversion as a sampling frequency of a baseband signal of the narrow-area cell,
wherein the processor is configured to
set a radio frame length of the narrow-area cell to the same length as the subframe length of the wide-area cell to perform assignment of an OFDM signal,
wherein n/m is greater than 1, wherein the processor sets a subframe length of the narrow-area cell at the subframe length of the wide-area cell/(n/m) when the narrow-area cell applies FDD, while when the narrow-area cell applies TDD, setting a subframe length of the narrow-cell at two times the subframe length in applying FDD to perform assignment of a signal.

2. The user terminal according to claim 1, wherein the wide-area cell is an LTE or LTE-A system.

3. The user terminal according to claim 2, wherein the processor sets a frequency of the reference signal at 30.72 MHz.

4. A radio base station for forming a narrow-area cell to communicate with a user terminal in a radio communication system where the narrow-area cell is provided inside a wide-area cell, comprising:
 a processor and a memory, wherein
 the processor generates a sampling frequency of a baseband signal of the wide-area cell as a reference signal;
 converts a frequency of the reference signal by n/m times, where n is the length of a subframe of the wide-area cell and m is the length of a subframe of the narrow-area cell when the narrow-area cell applies FDD; and
 uses a frequency subjected to frequency conversion as a sampling frequency of a baseband signal of the narrow-area cell,
 wherein the processor is configured to
 set a radio frame length of the narrow-area cell to the same length as the subframe length of the wide-area cell,
 wherein n/m is greater than 1,
 wherein the processor sets a subframe length of the narrow-area cell at the subframe length of the wide-area cell/(n/m) when the narrow-area cell applies FDD, while when the narrow-area cell applies TDD, setting a subframe length of the narrow-cell at two times the subframe length in applying FDD to perform assignment of a signal.

5. A radio communication method in which a user terminal communicates with a radio base station for forming a wide-area cell and another radio base station for forming a narrow-area cell in a radio communication system where the narrow-area cell is provided inside the wide-area cell, comprising:
 in the user terminal, generating a sampling frequency of a baseband signal of the wide-area cell as a reference signal;
 converting a frequency of the reference signal by n/m times, where n is the length of a subframe of the wide-area cell and m is the length of a subframe of the narrow-area cell when the narrow-area cell applies FDD; and
 using a frequency subjected to frequency conversion as a sampling frequency of a baseband signal of the narrow-area cell,
 wherein the user terminal
 sets a radio frame length of the narrow-area cell to the same length as the subframe length of the wide-area cell,
 wherein n/m is greater than 1,
 wherein the user terminal sets a subframe length of the narrow-area cell at the subframe length of the wide-area cell/(n/m) when the narrow-area cell applies FDD, while when the narrow-area cell applies TDD, setting a subframe length of the narrow-cell at two times the subframe length in applying FDD to perform assignment of a signal.

* * * * *